United States Patent [19]
Sponable

[11] Patent Number: 5,827,149
[45] Date of Patent: Oct. 27, 1998

[54] ELECTRICALLY OPERATED PARK LOCK FOR AUTOMATIC TRANSMISSION

[75] Inventor: Edward E. Sponable, Novi, Mich.

[73] Assignee: Hi-Lex Corporation, Battle Creek, Mich.

[21] Appl. No.: 689,029

[22] Filed: Jul. 30, 1996

[51] Int. Cl.⁶ .............................. B60K 41/26; F16H 57/10
[52] U.S. Cl. .............................. 477/92; 19/4 A; 74/411.5; 188/82.7
[58] Field of Search .............................. 477/92; 192/4 A; 74/411.5, 577 R, 577 S; 188/82.7, 82.77

[56] References Cited

U.S. PATENT DOCUMENTS

| | | | |
|---|---|---|---|
| 2,860,731 | 11/1958 | Hause | 188/82.7 |
| 2,954,103 | 9/1960 | Sand | 188/82.7 |
| 3,631,947 | 1/1972 | Laing | 475/331 |
| 3,856,119 | 12/1974 | Harrington | 188/82.7 |
| 4,614,256 | 9/1986 | Kuwayama et al. | 192/4 A |
| 4,629,043 | 12/1986 | Matsuo et al. | 492/4 A |
| 4,790,204 | 12/1988 | Tury et al. | 74/483 PB |
| 4,892,014 | 1/1990 | Morell et al. | 192/4 |
| 5,180,038 | 1/1993 | Arnold et al. | 192/4 A |
| 5,357,820 | 10/1994 | Moroto et al. | 74/335 |
| 5,363,713 | 11/1994 | Pearson | 74/425 |
| 5,526,909 | 6/1996 | Ohkawa | 192/4 A |
| 5,531,303 | 7/1996 | Raszkowski | 192/4 A |

*Primary Examiner*—Charles A. Marmor
*Assistant Examiner*—Sherry Lynn Estremsky
*Attorney, Agent, or Firm*—Young & Basile, P.C.

[57] ABSTRACT

An electrically powered park lock actuator for use with an automotive vehicle transmission. The actuator is mechanically independent from a shift actuator which shifts the transmission between gear ranges, and comprises two high-speed, reversible DC electric motor acting via a speed reduction gear train to move a locking pawl into and out of engagement with a gear on the transmission output shaft. The shafts of the two motors are connected to a common worm which forms the fist stage of the gear train, and either one of the motors is individually capable of actuating the locking pawl. In the preferred embodiment, the park lock actuator is controlled by an electronic transmission control system so that the lock actuator may be controlled in coordination with a power-operated transmission gear shift actuator for integrated operation of the transmission. A back-up battery is supplied to provide sufficient power to unlock the transmission in the event of a failure of the vehicle main electrical power system.

16 Claims, 3 Drawing Sheets

ELECTRICALLY OPERATED PARK LOCK FOR AUTOMATIC TRANSMISSION

FIELD OF THE INVENTION

This invention relates to a mechanism for locking the output shaft of an automotive vehicle automatic transmission against rotation when the transmission is in Park, and more specifically to such a locking mechanism that is operated by one or more electric motors and is mechanically independent from the gear shift actuation means of the transmission.

BACKGROUND OF THE INVENTION

An automatic transmission of the type commonly used in automotive vehicles is controlled by a gear shift lever located in the driving compartment and movable by the vehicle operator between positions corresponding to transmission gear ranges such as Park, Reverse, Neutral, Drive, and Low. A linear actuation cable is attached at its first end to the gear shift lever, and movement of the gear shift lever alternatively pushes or pulls on the cable to move a transmission mode select lever attached to the other end of the cable. The mode select lever is mechanically connected to a shift valve within the transmission housing, and movement of the shift valve effects shifting of the transmission between gears.

When the gear shift lever is placed in the Park position, two related mechanical actuations take place within the transmission. First, the mode select lever is moved to disengage the transmission output shaft from the motor. Second, a park lock pawl is moved into locking engagement with a gear on the output shaft to thereby lock the output shaft against rotation. The lock pawl is normally moved, either directly or indirectly, by the same push/pull movement of the linear actuation cable that actuates the mode select lever.

In recent years, automobile manufacturers have developed electronically actuated transmission systems in which the gear shift lever and the linear actuation cable are replaced by a push-button type gear shift selector, an electronic transmission control system, and a power-actuated shift module located on the transmission. The shift module receives commands from the transmission control system and includes electric and/or hydraulic actuators which move the mode select lever as necessary to shift the transmission between gear ranges. The transmission control system receives inputs from the vehicle operator via the gear shift selector push-buttons and from various sensors which monitor vehicle performance such as exhaust manifold pressure, and generates shift commands based upon these inputs in accordance with a programmed shift control logic. Such electrically controlled and actuated transmission systems are disclosed in U.S. Pat. Nos. 4,790,204 and 4,892,014. The substitution of electronic components for the traditionally used shift lever and linear actuation cable is aimed at reducing the weight, size and cost of the overall system and at simplifying the integration of various safety features such as an automatic door lock actuator or a brake/shift interlock which prevents shifting of the transmission out of Park unless the vehicle service brake and/or parking brake is applied.

Actuation of the mode select lever to shift the transmission between gears requires relatively little force so that, ideally, a power-actuated shift system should require relatively small, low powered electric motors. But actuation of the park lock pawl to unlock the output shaft when the transmission is shifted out of Park can sometimes require a significantly greater amount of force than is necessary to shift the transmission. This greater force may be required because when the transmission is in Park and the lock pawl is engaged with the gear on the output shaft, the pawl may be resisting substantial torque applied to the output shaft by the vehicle drive train, this torque causing binding between the pawl and the output shaft gear. This would be the case, for example, when the vehicle is parked on an incline and engagement between the park lock pawl and the output shaft gear is preventing the vehicle from rolling down the incline.

In most prior art systems, the same actuator motor used to shift the transmission between gears also actuates the park lock pawl when the shift into or out of Park takes place, and so the motor must be powerful enough to release the park lock pawl under worst-case conditions. Accordingly, the motor must be much more powerful than is necessary for gear shift operations, and hence will be larger and consume more power than is desirable. One solution to this problem is disclosed in U.S. Pat. No. 5,357,820 which teaches a shifter wherein a mechanical connection between the shift lever and the transmission mode select lever is maintained for shifting between Park, Reverse, Neutral, and Drive, while a relatively low-powered stepper motor is utilized for shifts between gears within the Drive range.

SUMMARY OF THE INVENTION

It is an object of the present invention to provide a power-actuated park lock mechanism for use with an automotive vehicle transmission, the park lock mechanism being capable of quickly and positively locking and unlocking the transmission output shaft even when the output shaft is under torque loading.

According to the invention, the lock actuator comprises electric motor means acting via speed reducing gear means to move a locking pawl into and out of engagement with a gear on the output shaft. The actuator is mechanically independent from a shift actuator means which is used to shift the transmission between gear ranges. By separating the output shaft lock actuator from the gear shift actuator means, the shift actuator means may be smaller and lower powered, since it does not also need to supply the relatively high torque that is sometimes required to disengage the lock pawl from the output shaft.

According to another feature of the invention, the transmission lock actuator is controllable by an electronic transmission control system which also controls shifting of the transmission between gear ranges. The lock actuator may thus be controlled in coordination with a power-operated transmission gear shift actuator for integrated operation of the transmission.

According to yet another feature of the invention, the electric motor means comprises two electric motors either of which is capable, acting individually, of moving the lock pawl between the locked and unlocked positions. This dual motor arrangement provides a degree of mechanical and electrical redundancy to the system thereby improving reliability.

According to a further feature of the invention, the speed reduction gear means connecting the motors to the park lock pawl comprises a worm gear and a worm, and both of the electric motors are connected to the worm to drive it in rotation. This gear train configuration results in a very compact and mechanically robust lock actuator.

According to a still further feature of the invention, the lock actuator is provided with a back-up electrical power supply to permit operation in the event that the primary vehicle electrical system is inoperative because of, for example, a dead battery. This feature allows the transmission lock to be disengaged so that the vehicle may be towed if the vehicle battery has gone dead or been removed from the vehicle while it is parked.

According to a further feature of the invention, the back-up electrical power supply comprises a storage battery, the battery providing sufficient power for the actuator to unlock the output shaft.

These and other advantages and objects of the invention will become apparent upon a reading of the following detailed description of the preferred embodiment of the invention and examination of the drawings.

DETAILED DESCRIPTION OF THE PREFERRED EMBODIMENT

Figure 1:
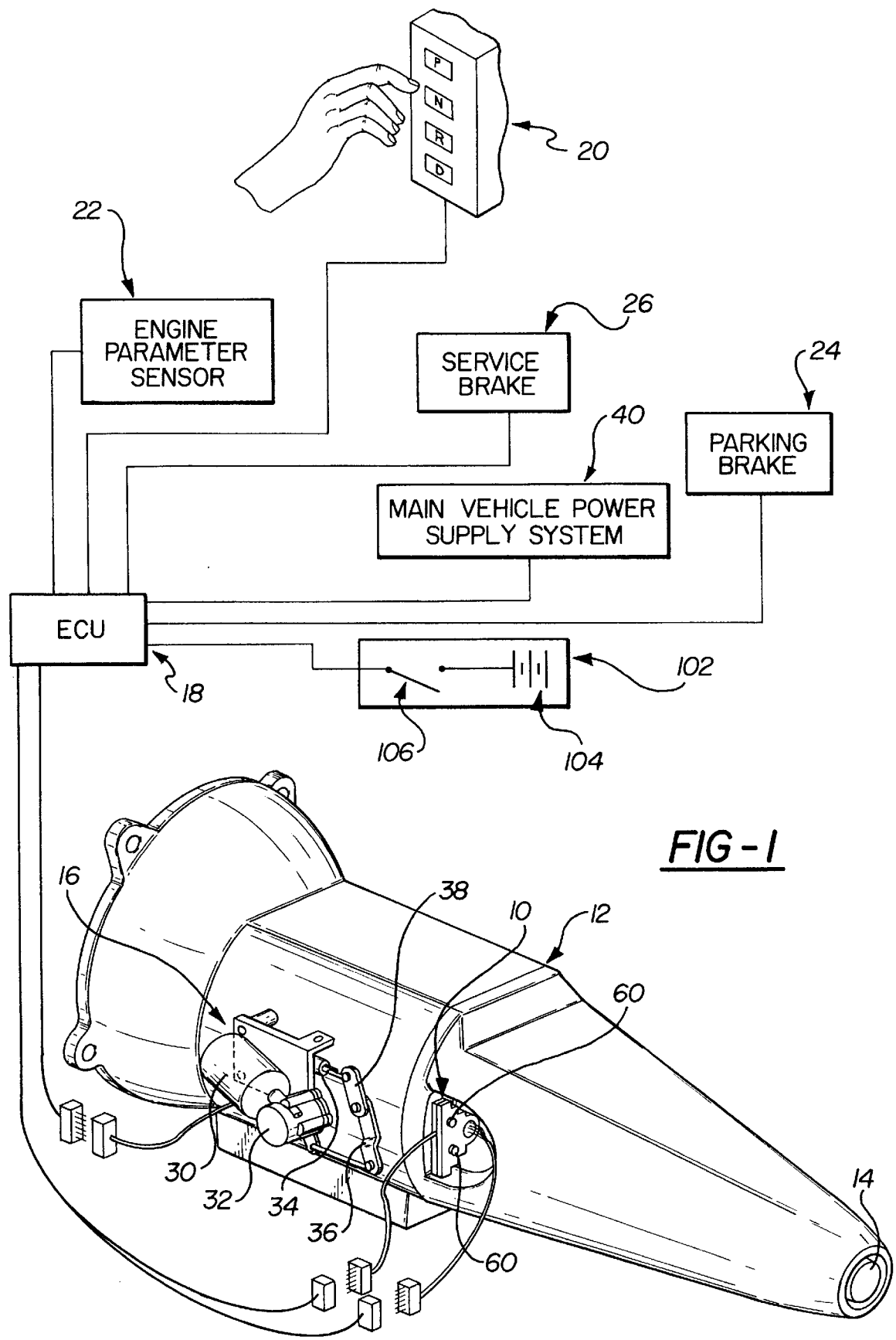
FIG. 1 is a perspective view of a park lock actuator according to the present invention operatively mounted to an electronically controlled, power-actuated automatic transmission.

In FIG. 1, the invention park lock actuator 10 is shown operatively mounted to an automatic transmission 12 such as is used in an automotive vehicle to transfer rotary power from a engine (not shown) to an output shaft 14 and thence to the vehicle drive wheels (not shown). Transmission 12 is shiftable between a plurality of gear ranges such as Park, Reverse, Neutral, Drive, L2 and L1. In the Reverse, Drive, L1 and L2 gear ranges output shaft 14 is connected to the motor by system of planetary gears (not shown), while in the Park and Neutral ranges the motor is completely disconnected from the output shaft so that no torque is transferred. When transmission 12 is in Park, park lock actuator 10 operates to inhibit rotation of output shaft 14 so that the vehicle drive wheels can not turn, thereby serving as a type of parking brake.

In the preferred embodiment of the invention, park lock actuator 10 is integrated with a transmission having an electronically controlled and power actuated gear shift system, such a system being comprised essentially of a power shift module 16 and an electronic control unit (ECU) 18. ECU 18 receives a plurality of electronic signals from components such as a driver-actuable gear select panel 20, engine parameter sensors 22, a parking brake condition sensor 24, and a service brake condition sensor 26. ECU 18 uses the electronic signals from these components as inputs to a pre-programmed transmission control logic, and the ECU generates transmission shift signals which are then transmitted to power shift module 16 through a wiring harness 28.

In the depicted embodiment, power shift module 16 comprises a DC stepper motor 30 with an associated gear drive 32 and a solenoid 34. These two actuators are connected to a transmission mode select lever 36 and a kick down lever 38 respectively, push/pull actuation of the levers causing the transmission to shift between gear ranges in the conventionally known manner. Examples of electronically controlled and power actuated automatic transmission systems of the general type related to the present invention are disclosed in U.S. Pat. No. 4,790,204 and U.S. Pat. No. 4,892,014 the disclosures of which are incorporated herein by reference.

ECU 18, stepper motor 30 and solenoid 34 receive electric power for their operation from a main electric power supply system 40. Main power supply system 40 comprises an engine-driven alternator (not shown) and automotive battery (not shown) as conventionally known in the automotive art, and powers substantially all vehicle electrical components and systems.

Figure 3:
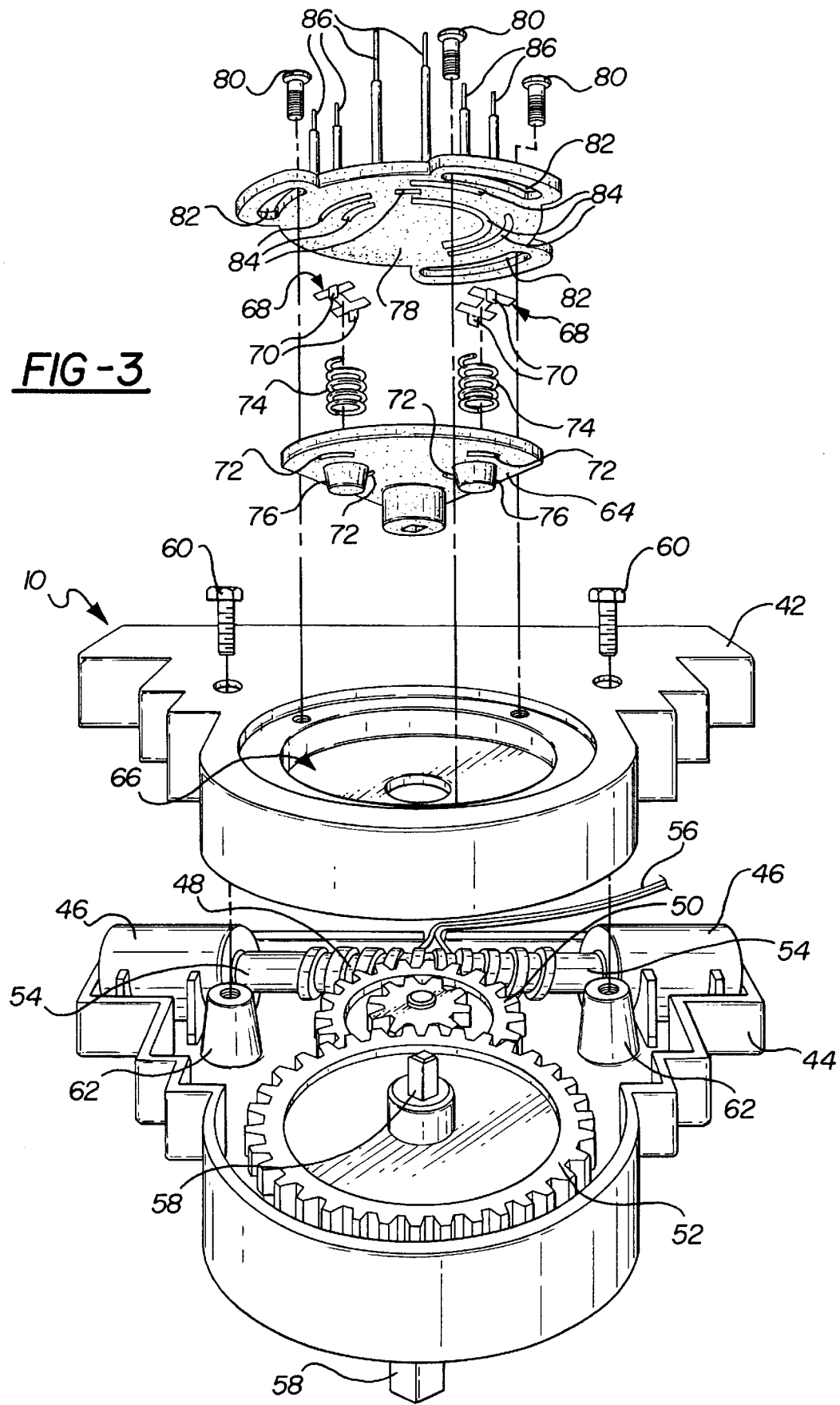
FIG. 3 is a partially exploded perspective view of the invention park lock actuator.

As seen in FIG. 3, park lock actuator 10 comprises first and second housing sections 42, 44, a pair of electric motors 46, a worm 48, a worm/reduction gear 50, and a drive gear 52. Electric motors 46 are mounted immovably inside of the housing such that their shafts 54 are in coaxial alignment with one another, and the motors are supplied with electrical power by wires 56. Worm 48 is fixed to both motor shafts 54 and worm/reduction gear 50 and drive gear 52 are mounted for rotation within housing sections 42, 44, the three rotating components being operatively interconnected to form a speed reduction gear train transmitting the rotary power of the motors to a drive shaft 58. Drive shaft 58 extends axially from drive gear 52 in both directions, passing through holes in both first and second housing sections 42, 44. Bolts 60 pass through holes in first housing section 42 and engage threaded bosses 62 on second housing section 44 to hold the housing sections together.

Motors 46 are reversible DC motors operable on 12 volt current as supplied by standard automotive electrical systems, and operate at speeds of approximately 4000 to 5000 RPM while drawing approximately 2 amps or less. A motor having acceptable characteristics is the Model No. HF383XLG manufactured by the Johnson Electric Industrial Manufactory Ltd, Hong Kong.

An encoder drive arm 64 is fixed to a first end of drive shaft 58 for rotation therewith and is retained in a recess 66 formed in the outer surface of first housing section 42. Encoder drive arm 64 is shaped like a sector of a circle and has two electrically conductive contacts 68 disposed on its surface. Contacts 68 have prongs 70 that fit into locating slots 72 in drive arm 64, and springs 74 are retained in spring pockets 76 formed in the drive arm beneath the contacts. Springs 74 apply a force to the underside of contacts 68 biasing them away from the surface of drive arm 64.

An encoder plate 78 is positioned over recess 66 so as to enclose drive arm 64 therein, the plate being secured to first housing section 42 by screws 80 passing through elongated slots 82. A plurality of switch pads 84 are disposed on the surface of encoder plate 78 that faces toward encoder drive arm 64 when the encoder plate is mounted to first housing section 42. Switch pads 84 comprise arcuate strips of electrically conductive metal located at varying radii and angular positions with respect to the axis of drive shaft 58. A wire 86 is connected with each of switch pads 84, and the wires extend from the opposite side of encoder plate 78 where they are gathered into a wire bundle connected to ECU 18.

Figure 4:
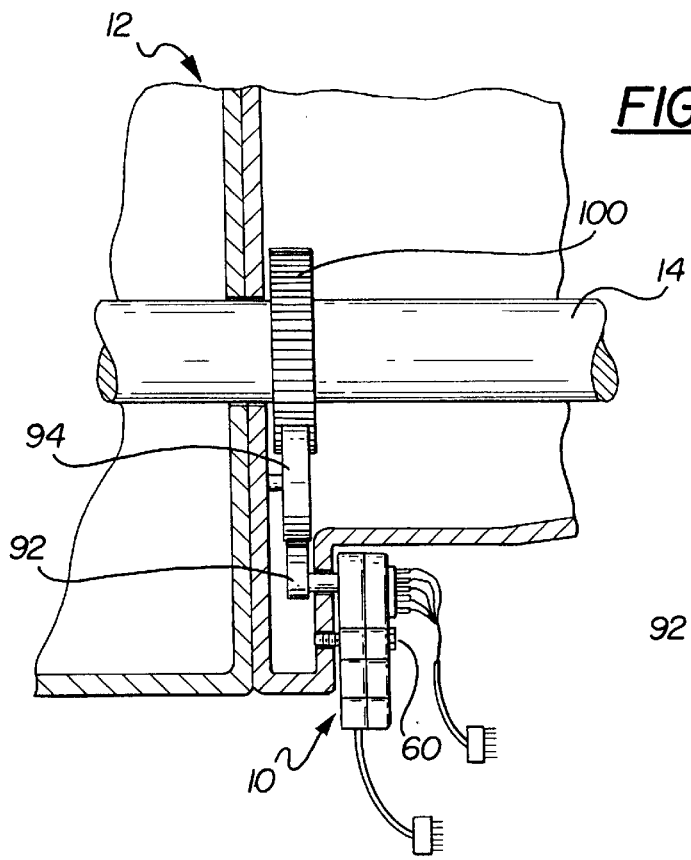
FIG. 4 is a partially cut away view of the automatic transmission of FIG. 1 showing the invention park lock actuator holding a lock pawl in engagement with a transmission output shaft gear.

Park lock actuator 10 is mounted to automatic transmission 12 by means of bolts 60 which engage threaded holes in the transmission casing. As best seen in FIG. 4, the end of drive shaft 58 opposite encoder drive arm 64 passes through an opening in the transmission casing and is fixed to a pawl actuator gear 92. A lock pawl 94 is pivotingly mounted within transmission 12 and has a gear tooth end 96 which engages pawl actuator gear 92, and an opposite locking end 98 movable into and out of engagement with a gear 100 mounted on output shaft 14.

A back-up power supply 102 is electrically connected directly to park lock actuator motors 46 and comprises a storage battery 104 and a switch 106. Switch 106 is normally in an open condition, and is actuable to connect battery 104 to motors 46.

Park Lock Actuator Operation

ECU 18 coordinates the operation of park lock actuator 10 with that of power shift module 16 so as to: 1) energize the park lock actuator to move lock pawl 94 into engagement with output shaft gear 100 substantially simultaneously with transmission 12 being shifted from Park to any other gear range; and 2) energize the park lock actuator to move the lock pawl into engagement with the output shaft gear substantially simultaneously with the transmission being shifted into Park.

In a normal sequence of vehicle operation, transmission 12 is in Park prior to and during engine start. When the driver selects a driving gear range by pushing a button on gear select panel 20, ECU 18 accepts this input along with inputs from other sensors and executes its transmission control logic to determine whether or not to command the shift out of Park. For example, the transmission control logic may not permit the shift out of Park to occur unless the service brake and/or the parking brake are engaged, or if engine parameter sensors 22 indicate that the engine is operating above a certain RPM. Any number of vehicle systems may provide inputs to ECU 18 and so be integrated into the operation of transmission 12.

When all of the conditions required by the transmission control logic are satisfied, ECU 18 energizes stepper motor 30 and/or solenoid 34 as necessary to shift the transmission into the selected gear range. Substantially simultaneously with this actuation of the transmission, ECU 18 supplies park lock actuator 10 with electric current of the correct polarity to cause motors 46 to rotate so as to drive the gear train in the direction which withdraws lock pawl 94 from engagement with output shaft gear 100.

The angular position of drive shaft 58 and, accordingly, the locked or unlocked condition of lock pawl 94 is continuously communicated to ECU 18 by means of encoder drive arm 64 and encoder plate 78. ECU 18 supplies electric current to encoder plate switch pads 84 via wires 86, and at a given angular position of drive shaft 58 the position of drive arm 64 with respect to encoder plate 78 places each contact 68 in circuit-forming contact with a particular pair of switch pads. A change in the angular position of drive arm 64 results in different pairs of switch pads 84 being bridged by contacts 68, and ECU 18 reads the state of the continuity between the various wires 86 to determine the position of drive shaft 58.

Figure 6:
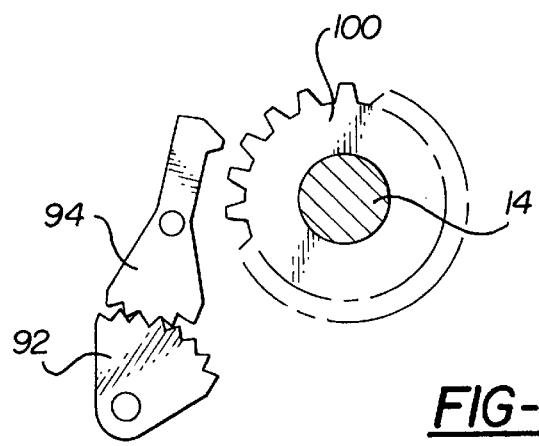
FIG. 6 is an alternative view taken along line 5—5 of FIG. 4, showing the lock pawl disengaged from the output shaft gear.
Figure 2:
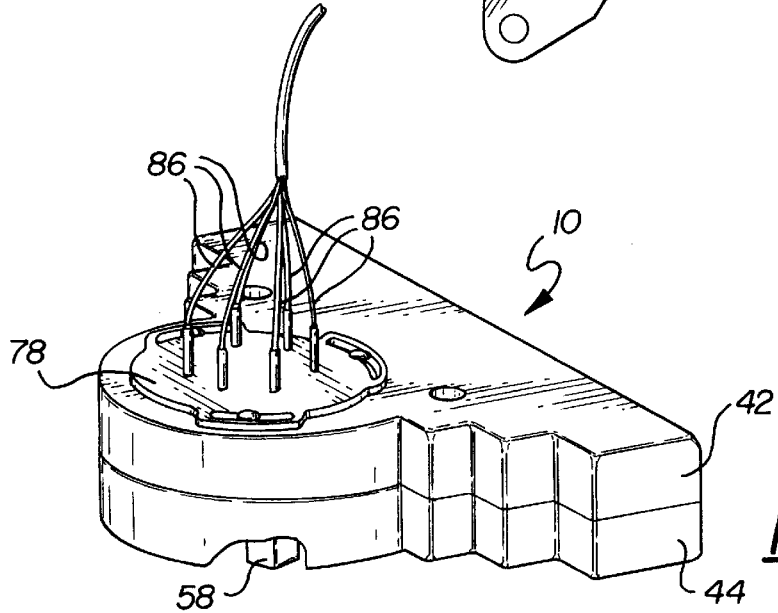
FIG. 2 is a perspective view of the invention park lock actuator.

As long as transmission 12 remains in a gear range other than Park, ECU 18 leaves lock actuator 10 deenergized so that lock pawl 94 maintains the unlocked position shown in FIG. 6, thus permitting output shaft 14 to be driven by the engine and/or to "free-wheel" if the vehicle is coasting or in Neutral.

Figure 5:
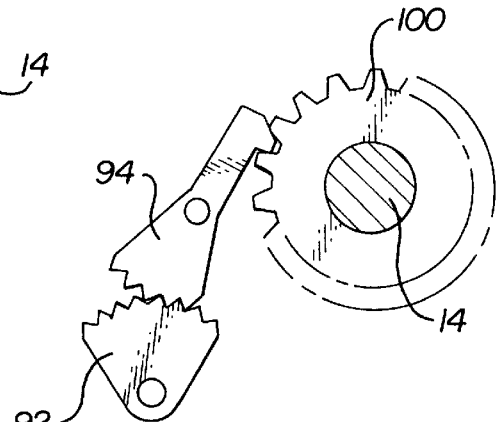
FIG. 5 is a view taken along line 5—5 of FIG. 4.

To shift transmission 12 back into Park, the vehicle driver selects Park on gear select panel 20. Again, the transmission control logic may call for ECU 18 to consider other vehicle system inputs in determining whether or not to command the shift to Park. For example, the shift into Park may not be allowed to occur if output shaft 14 is rotating at too high a speed or if the engine power setting is too high. When the proper inputs are received, ECU 18 energizes stepper motor 30 and solenoid 34 as required to disengage output shaft 14 from the vehicle engine, and substantially simultaneously supplies motors 46 with DC current of the correct polarity to rotate worm 48 and the other gear train components so as to move lock pawl 94 into engagement with output shaft gear 100, as shown in FIG. 5.

In the preferred embodiment of the invention depicted, drive shaft 58 need rotate only approximately 35° to move lock pawl 94 between the locked and unlocked positions. Motors 46 are sufficiently powerful that in the event that one of the motors fails or otherwise becomes inoperative the remaining motor is capable, acting alone, of actuating lock pawl 94 between the locked and unlocked positions.

It is possible for main vehicle power supply system 40 to become incapacitated, for example due to a dead or removed battery, while park lock actuator 10 is in the locked condition. In such a case, the vehicle can not be towed in a manner that requires the vehicle drive wheels to rotate unless lock pawl 94 can be disengaged from output shaft 14. Accordingly, back-up power supply 102 is dedicated solely to powering park lock actuator 10 in a manner to drive lock pawl to the unlocked position. Battery 104 and switch 106 are located within the vehicle in a spot where they may be reached without undue difficulty in a power loss situation, so that switch 106 may be actuated to its closed condition to energize motors 46.

If desired, the transmission lock actuator may be provided with a purely mechanical linkage actuable by the vehicle operator to move the locking pawl to the unlocked position independently of operation of motors 46. This provides a back-up transmission unlock in the event of a failure of the motors, the electrical system, or any associated system.

ECU 18 may also be programmed and integrated with other vehicle systems in a manner that it can command actuations of those other systems in coordination with the condition of transmission 12. For example, ECU 18 could command a power door lock system to lock the vehicle doors when transmission 12 is shifted out of Park, or could coordinate the engagement and disengagement of the parking brake when shifting of the transmission into and out of Park.

It will be appreciated that the drawings and descriptions contained herein are merely meant to illustrate (a) particular embodiment(s) of the present invention and are not meant to be limitations upon the practice thereof, as numerous variations will occur to persons of skill in the art. For example, although the invention is described above in combination with a transmission having an electronically controlled and power-actuated gear shift system, it is to be understood that the invention may also be practiced in relation to a transmission having a manual gear shift system, or a hybrid powered/manual system.

I claim:

1. A transmission lock actuator for use with an automotive vehicle automatic transmission of the type having a plurality of gear ranges, shift actuator means for shifting the transmission between gear ranges, an output shaft, and locking means movable between a first position wherein the locking means inhibits rotation of the output shaft and a second position wherein the locking means does not inhibit rotation of the output shaft, the transmission lock actuator characterized in that:

the transmission lock actuator is mechanically independent of the shift actuator means and comprises electric drive means energizable to move the locking means between the first and second positions.

2. A transmission lock actuator according to claim 1 controllable by an electronic transmission control system.

3. A transmission lock actuator according to claim 1 further comprising speed reduction gear means drivable by the electric drive means to move a locking pawl between a locked position wherein the locking pawl engages the output shaft to lock the output shaft against rotation and an unlocked position wherein the locking pawl is disengaged from the output shaft.

4. A transmission lock actuator according to claim 3 wherein the electric drive means comprises two electric motors, both of the motors being individually capable of moving the locking pawl between the locked and unlocked positions.

5. A transmission lock actuator according to claim 4 wherein the gear means comprises a worm gear and a worm, and both of the electric motors are drivingly connected to the worm.

6. A transmission lock actuator according to claim 1 wherein the electric drive means is powerable by a main vehicle electrical power system and by a back-up electrical supply independent from the main vehicle electrical power system, whereby the electric drive means is operable by the back-up electrical supply in the event that the main vehicle electrical power system is unable to power the electric drive means.

7. A transmission lock actuator according to claim 6 wherein the back-up electrical power supply comprises a storage battery.

8. A transmission lock actuator for use with an automotive vehicle automatic transmission of the type having a plurality of gear ranges, shift actuator means for shifting the transmission between gear ranges, an electronic transmission control system for controlling operation of the shift actuator means, an output shaft, and locking means movable between a first position wherein the locking means inhibits rotation of the output shaft and a second position wherein the locking means does not inhibit rotation of the output shaft, the transmission lock actuator characterized in that:

the transmission lock actuator comprises a pair of electric motors energizable in accordance with commands of the electronic shift control system and speed reducing gear means drivable by the electric motors to move the locking means between the first and second positions, the electric motors and the speed reducing gear means being mechanically independent of the shift actuator means.

9. An automotive vehicle automatic transmission having a plurality of gear ranges, an output shaft, power-actuated shift means for shifting the transmission between gear ranges, a transmission lock movable to selectively inhibit rotation of the output shaft, and a transmission lock actuator for moving the transmission lock and comprising electric drive means, said electric drive means being separate from the power-actuated shift means.

10. An automotive vehicle automatic transmission according to claim 9 wherein the transmission lock actuator further comprises gear means drivable by the electric drive means to move a locking pawl between a locked position wherein the locking pawl engages the output shaft to lock the output shaft against rotation and an unlocked position wherein the locking pawl is disengaged from the output shaft.

11. An automotive vehicle automatic transmission according to claim 10 wherein the electric drive means comprises two electric motors, both of the motors being individually capable of moving the locking pawl between the locked and unlocked positions.

12. An automotive vehicle automatic transmission according to claim 11 wherein the gear means comprises a worm gear and a worm, and both of the electric motors are drivingly connected to the worm.

13. An automotive vehicle automatic transmission according to claim 12 controllable by an electronic transmission control system.

14. An automotive vehicle automatic transmission according to claim 13 wherein the transmission control system is responsive to the condition of a vehicle service brake system and commands the actuator to maintain the locking pawl in the locked position unless the service brake system is activated to inhibit motion of the vehicle.

15. An automotive vehicle automatic transmission according to claim 9 wherein the electric drive means is powerable by a main vehicle electrical power system and by a back-up electrical supply independent from the main vehicle electrical power system, whereby the drive means is operable by the back-up electrical supply in the event that the main vehicle electrical power system is unable to power the drive means.

16. An automotive vehicle automatic transmission according to claim 15 wherein the back-up electrical power supply comprises a storage battery.

* * * * *